United States Patent [19]

Deman et al.

[11] Patent Number: 4,554,668
[45] Date of Patent: Nov. 19, 1985

[54] FREQUENCY-HOPPING RADIO COMMUNICATIONS SYSTEM

[75] Inventors: Pierre Deman; Henri Butin, both of Paris, France

[73] Assignee: Thomson-CSF, Paris, France

[21] Appl. No.: 496,564

[22] Filed: May 20, 1983

[30] Foreign Application Priority Data

May 27, 1982 [FR] France ............................... 82 09258

[51] Int. Cl.⁴ .............................................. H04B 7/12
[52] U.S. Cl. ........................................ 375/1; 375/107
[58] Field of Search .................... 375/1, 30, 112, 115, 375/107, 108; 455/33, 31, 51; 370/32, 103, 104

[56] References Cited

U.S. PATENT DOCUMENTS

| | | | |
|---|---|---|---|
| 3,836,726 | 9/1974 | Wells et al. | 455/33 |
| 3,973,081 | 8/1976 | Hutchins | 375/122 |
| 4,023,103 | 5/1977 | Malm | 455/51 |
| 4,066,964 | 1/1978 | Costanza et al. | 455/51 |
| 4,415,770 | 11/1983 | Kai et al. | 455/33 |
| 4,423,505 | 12/1983 | Greig | 370/32 |

FOREIGN PATENT DOCUMENTS 1954754 10/1969 Fed. Rep. of Germany.
2603524 4/1977 Fed. Rep. of Germany.

OTHER PUBLICATIONS

IEEE Transactions of Vehicular Technology, vol. VT-27, No. 4, Nov. 1978, IEEE N.Y. by G. R. Cooper, "A Spread-Spectrum Technique for High Capacity Mobile Communications", pp. 264–275.

Primary Examiner—Robert L. Griffin
Assistant Examiner—Stephen Chin
Attorney, Agent, or Firm—Cushman, Darby & Cushman

[57] ABSTRACT

A radio communications system comprising at least one master station and a plurality of slave stations in two-way frequency-hopping communication therewith. For telephony, speech is digitally encoded. Digital data is transmitted in packets using successive bursts at different frequencies separated by intervals of silence. Each slave station has its own frequency-hopping pattern independent of the patterns of the other slave stations but sharing a common pool of available frequencies. The master stations are capable of generating any of the slave station patterns instantly. The master stations broadcast network time information for synchronization purposes, and the slave station patterns are determined by a combination of a slave station identification number and network time.

12 Claims, 2 Drawing Figures

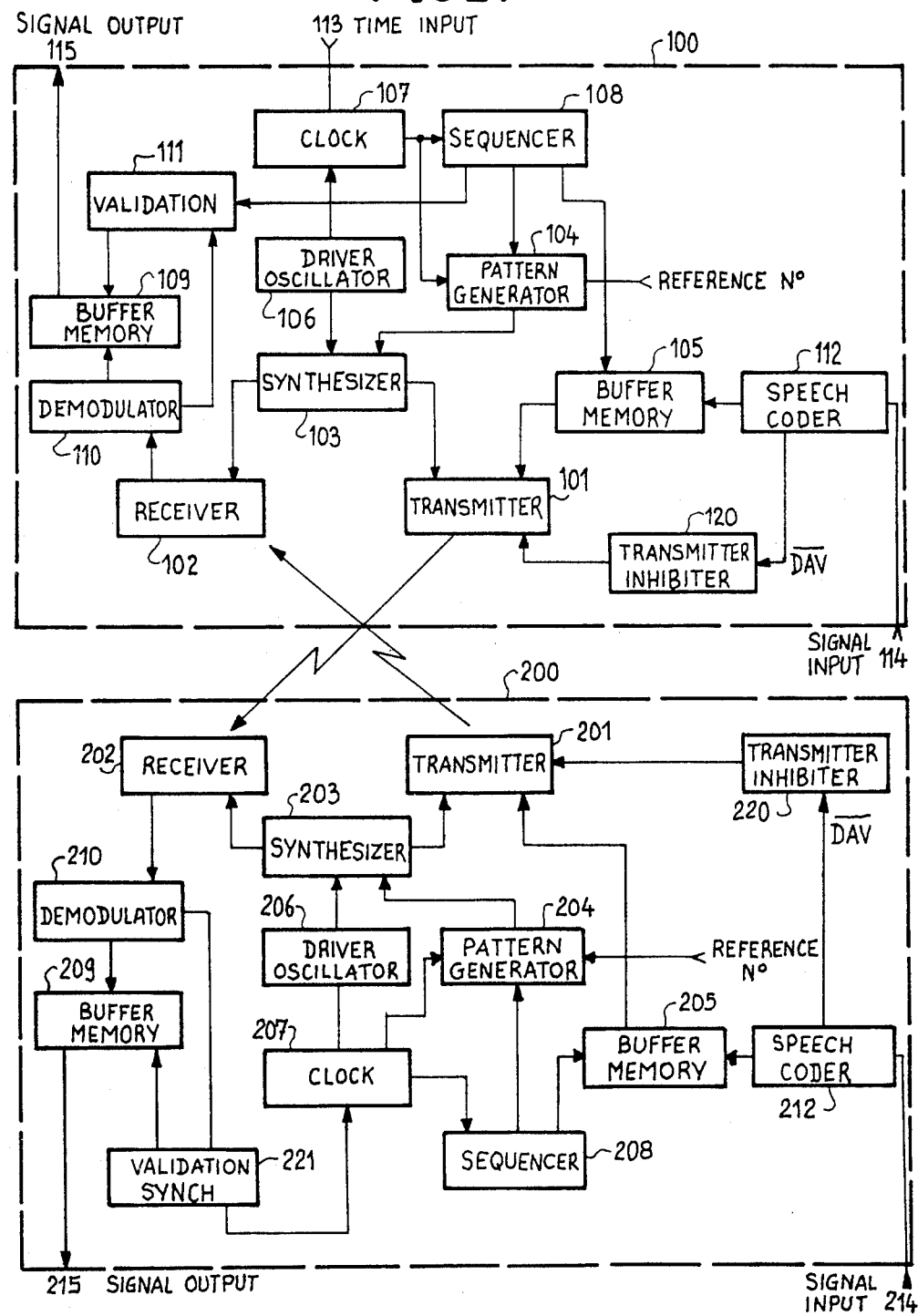
FIG_1

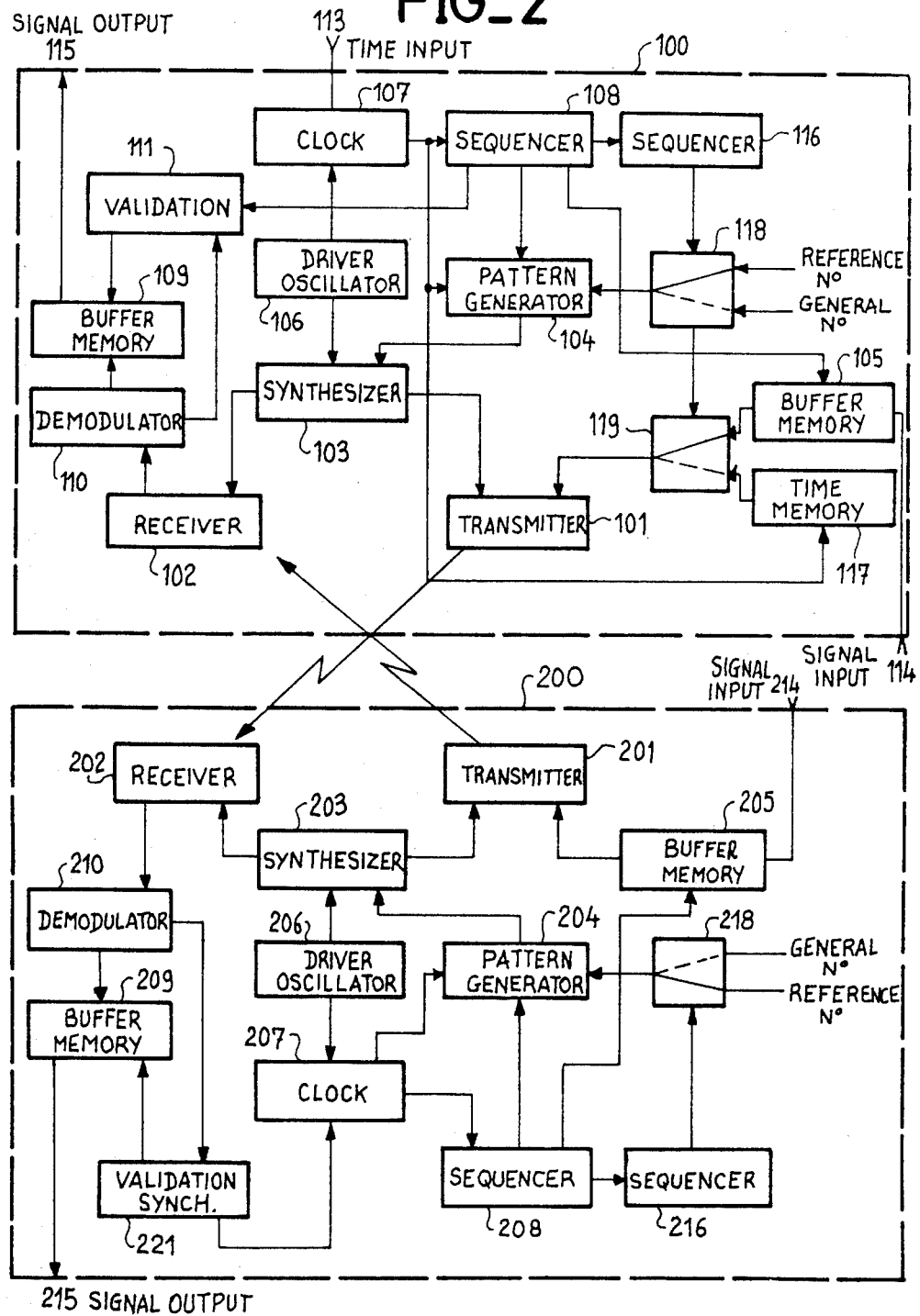

FREQUENCY-HOPPING RADIO COMMUNICATIONS SYSTEM

The invention relates to radio communications networks (radio nets), ie. to any system using two-way radio links for transmitting telephony or data between two or more stations, and it relates particularly, but not exclusively, to radio links between mobile subscribers and one or more fixed master stations.

BACKGROUND OF THE INVENTION

So-called "cellular" nets have fixed stations spread out over the ground, with each fixed station being responsible for establishing communication with mobiles in a region, known as a "cell", surrounding each fixed station.

Conventional radio nets use channels which are defined by the values for their center frequencies; information is transmitted by narrow band analog modulation, frequency modulation, amplitude modulation, or single side band. In nets having a large number of mobile subscribers, the frequency channels are not allocated to specific groups of links, but are held in common to be allocated to a calling mobile as a function of traffic. In such a system, channel management is important, since the bulk of the protection against interference between different calls is obtained by allocating different frequencies to links which are geographically close to one another.

The increasing numbers of customers applying to be connected as mobile radiotelephone subscribers require new radio net structures that enable greater density in the use of the available spectrum, or more precisely that provide greater spectrum efficiency which, by reference to telephony, can be measured in erlangs/hertz/km$^2$.

A first method of increasing spectrum efficiency consists in reducing the range between the mobiles and the nearest fixed station, but there is a limit to the improvement which can be obtained in this manner. Present systems are moving in this direction.

Preferred embodiments of the present invention provide a radio communications system which is capable of obtaining greater spectrum efficiency, which is highly flexible in installation and use, and which reduces infrastructure costs.

To do this, radio communications systems in accordance with the invention use a system of dispersing power by frequency spreading which enables higher spectrum efficiency to be obtained in spite of the apparant chaos caused by superposing signals from different links in the same space-time-frequency continuum without constraint. The power dispersion technique used in radio communications systems in accordance with the present invention is frequency hopping, with each mobile station having its own frequency-hopping pattern known to the fixed stations. When there are several fixed or master stations they may readily be synchronized by simple means.

SUMMARY OF THE INVENTION

The present invention provides a radio communications system comprising at least one master station and a plurality of slave stations, wherein information to be transmitted is in digital form, wherein a two-way link between any of the slave stations and a master station is established over a frequency-hopping channel in which transmission takes place in bursts of predetermined duration at different frequencies with said frequency-hopping channel being determined by a frequency-hopping pattern which is associated with the slave station, each slave station having an independent frequency-hopping pattern associated therewith and all of the frequency-hopping channels using frequencies selected from a pool of frequencies common to all of the channels, and wherein the useful transmission bursts are synchronized for the system as a whole with each slave station being synchronized from data received from a master station.

BRIEF DESCRIPTION OF THE DRAWINGS

Embodiments of the invention are described by way of example with reference to the accompanying drawings, in which:

FIG. 1 is a block diagram of a link between a master station and a slave station in a radio communications system in accordance with the invention; and FIG. 2 is a block diagram of a variant of the system shown in FIG. 1.

MORE DETAILED DESCRIPTION

In some types of radio communications system, and in particular those which require protection against jamming, channels are no longer defined in terms of center frequencies, nor are they associated with narrow band modulation. The main kinds of system are either phase shift systems in which wide band modulation is obtained at a given frequency, or else they are rapid or frequency-hopping systems in which a packet of information is transmitted for a short period on a carrier of given frequency, and in which the next packet is transmitted on a carrier of different frequency chosen according to a predetermined code. Such systems require the use of complex synchronizing means at the beginning of a call, since the brevity of the transmissions and the lack of any fixed infrastructure prevent prior synchronisation. Further, the number of stations connected in a single net is generally limited, and stations in the same net generally follow the same frequency-hopping pattern.

Completely different problems are encountered when designing a radio communications system having a large number of mobile subscribers each of which may be connected to any fixed infrastructure station. The main problem is to increase the net's spectrum efficiency by limiting likely interference to acceptable values. Further, the synchronizing system in each station must be as simple as possible.

As outlined above, the improvement in spectrum efficiency provided in a radio communications system in accordance with the invention is obtained by employing a frequency spreading technique. The technique used is frequency-hopping transmission as defined above, in which information is transmitted in packets in successive bursts at different frequencies. Each subscriber has a particular frequency-hopping pattern, with the allowable frequencies being chosen from a predetermined pool of frequencies common to all of the subscribers, and with the master stations being capable of generating the same patterns on the basis of simple data. The bursts are separated by short intervals of dead time in order to facilitate frequency changing, and burst duration is large relative to the dead time and to the propagation time. The reasons for this choice are as follows: This technique requires least modification of the existing conventional structure of transmitters and receivers. Further, provided useful burst duration is long enough, this technique is no more sensitive to multiple path propagation than is fixed frequency transmission. Since the dead time is relatively short, the data transmission rate is increased very little (and remains less than 100 Kbits/s). It is shown below that the synchronization does not need to be particularly accurate provided that the dead time can be large relative to the propagation time between a fixed station and various mobiles. Finally, this technique is readily adaptable to nonlinear processing which can be most beneficial to this type of channel. The discontinuities due to the frequency hops and to the dead time makes it necessary to encode the information digitally. Digital data for transmission is already in digital form; speech for transmission needs to be encoded by a speech enoding system.

Further, all the stations on the net change frequency at the same instant. To do this, all the stations must be synchronized to a reference time common to all the elements of the system, with the master stations being directly synchronized to the reference time and with the slave stations synchronizing themselves on data received from the master stations.

Consequently, a frequency-hopping channel is defined in the space-time-frequency continuum by its own frequency-hopping pattern. The number of "independent" patterns which can be defined in said continuum is much larger than the number of different frequencies. In this system, one or more successive bursts on different channels may have the same frequencies. In which case there is "intrinsic" interference of the weaker channel by the stronger. The frequency-hopping patterns are said to be independent when the conditional probability of interference in n successive bursts at a given level of traffic is substantially equal to the probability of interference in one burst raised to the power n. This result is obtained by using a family of codes having this independence property for generating the frequency-hopping patterns.

Codes of this type are known, and are described, for example, in the following documents:

D. V. Sarwattee and M. B. Pursely in "Hopping Patterns for Frequency-hopped, Multiple Access Communication" Int. Conf. Commun. ICC 78 Toronto, Canada, June 4–7, 1978 pp. 741/743; and G. Einarsson in "Address assignment for a time-frequency coded spread-spectrum system", BSTJ vol 59, No. 7, September 1980, pp. 1241/1255.

Thus the channel reserved for a particular subscriber is permanently defined regardless of the subscriber's position, there being a one-to-one correspondance between each subscriber number and its frequency-hopping pattern. Further, said correspondence may be made public without inconvenience. The frequency to be used at each hop is completely determined both at the master station and at the slave (or subscriber) station by a knowledge of network time and the subscriber's identification number. Further, by means of a simple frequency scrambling technique, it can be arranged for information accidentally received by a third party to be incomprehensible.

Thus, a complete non-blocking matrix of frequency-hopping patterns can be defined for all the traffic and the calls from the fixed infrastructure to the mobiles, which matrix can become saturated only as a function of local traffic.

These choices considerably simplify the methods used to manage the radio nets.

The following explanations outline the increase in spectrum efficiency obtainable by such a system relative to a system having a pool of fixed frequencies.

Assume that there are two duplex bands each of 5 MHz bandwidth, giving N=200 channels at 25 KHz spacing; the attenuation as a function of the distance d varies as $1/d^4$ and has a log normal law of $\sigma=10$ dB.

In a prior art system using a common pool of single frequency channels and a repeated pattern of sixteen hexagonal cells, interference is determined by the six nearest hexagons in which the same frequencies are used, each of which is situated at a distance of eight times the cell radius. Since the attenuation is proportional, on average, to $1/d^4$, the field received by the central station from a mobile in its own cell is 36 dB up on the interference (again on average). Assuming that the modulation used requires a signal to be 12 dB up on the interference to provide adequate protection therefrom (a reasonable assumption for analog modulation), the time during which the signal received by a mobile is degraded by interference can be calculated as the sum of the occasions on which the attenuation is less than $(36-12)=24$ dB, ie. less than a value equivalent to 2.4 $\sigma$. This is 1% of the time. For all six potential interfering hexagons, the probable interference time is thus 6%, assuming uniform terrain and treating frequency distribution as being the same as time distribution.

Prior art spectrum efficiency is thus determined by the size of the pattern which enables 200/16 frequencies to be used per cell, ie. 12 frequencies which correspond to a traffic of 7.2 erlangs with a loss rate of 5% for 12 sender-receivers per cell.

In a frequency-hopping system using coded access in accordance with the invention, let the average number of calls be n and let the number of distinct channels be N.

The probability of intrinsic interference on any given channel from within the same cell can be calculated as:

$$((n-1)/N) \times (0.3)^2 \times 0.8$$

The term $(0.3)^2$ corresponds to voice activity, and the term 0.8 stems from the fact that the power from the mobiles is regulated in such a manner that in the event of conflict, there is a beneficial capture effect for the useful station in 20% of cases where the received field is at least 6 dB stronger than the interference.

To a first approximation the traffic in the six adjacent cells can be considered as being concentrated at a distance equal to the distance of the centers of the cells, ie. at twice the cell range. This gives an average attenuation proportional to $1/d^4$ equal to 12 dB, which means that the reference field strength is exceeded for 0.6 $\sigma$ or 0.27 of the time and per cell taking into account the 6 dB margin necessary for cancelling the code conflict effect, which gives an overall probability of intrinsic interference of $(n/N) \times (0.3)^2 \times 1.62$ for the six adjacent cells (where $1.62 = 0.27 \times 6$).

Likewise, for the 12 cells at a distance of 4 radii the figure is $(n/N) \times (0.3)^2 \times 0.43$ and for the 18 cells at a distance of 6 radii the figure is $(n/N) \times (0.3)^2 \times 0.11$.

Given the various approximations made, the overall probability of intrinsic interference (including the contributions from more distant cells) converges on a value which is less than $(n/N) \times (0.3)^2 \times 3$. To be comparable with the prior art system calculated above, the interference must remain less than 6%, on average, ie. (n/N) must not be greater than 0.22.

Since digital modulation requires a greater bandwidth than analog modulation, the number of available channels in a given frequency band is less than the number available to a prior art system using a pool of fixed frequencies. Assume that there only half as many channels available, giving N=100. Then for n/N=0.22 the value of n is 22 calls which 1.8 times as many as the number of calls possible using a prior art system in which a pool of fixed frequency channels are held in common in a given frequency band.

FIG. 1 is a block diagram of a portion of such a frequency-hopping radio communications system. The diagram shows a portion 100 of a fixed or master station and a slave station 200 which may be a mobile subscriber. Identical components in both stations are referenced by numbers having the same tens and unit digits but preceded by the digit 1 for master station components or by the digit 2 for slave station components.

The master station comprises a plurality of transmitter-receiver subassemblies such as the portion 100, each of which comprises a transmitter 101 having a modulation signal input and a carrier signal input, and a receiver 102 having a carrier signal input and a modulated signal output. Each transmitter-receiver subassembly further includes a synthesizer 103 having two outputs respectively connected to the carrier frequency inputs of the transmitter 101 and the receiver 102. The synthesizer has a driver signal input connected to the output from a driver oscillator 106, and a frequency hopping control input connected to the output from a frequency hopping pattern generator 104. The driver oscillator 104 is a highly stable oscillator and also serves to drive a clock 107. The clock comprises, for example, a series of divider stages, and is capable of being reset to a given time via a shift control input 113 connected to means outside the station, eg. to a receiver tuned to receive "pips" from a broadcast time signal. The clock 107 has an output connected to a control input of a sequencer 108 which generates signals based on the clock-determined time to define the beginning of each burst of transmission and the beginning of each intervening period of dead time. The period of dead time is used to set the synthesizer 103 to the frequency of the next burst of transmission, and to attenuate transient effects in the equipment due to steep fronts at the beginning and end of each burst.

The frequency generated by the synthesizer during each burst is defined by the frequency pattern generator 104 which derives the frequency from the time as defined by the sequencer 108 and from an identifying reference number or code which is different for each link. For example, there may be one reference number for each slave station and another one for a common signalling channel. Such frequency pattern generators are known (see above) and may operate according to algorithms of varying degrees of complexity.

The master station has a signal input 114. For a radio telephone station, the station further includes a speech coder 112. The speech coder includes a voice activity detector function and has a first output for digitized speech signal and a second output $\overline{DAV}$ connected to a transmitter inhibit circuit 120 to apply a voice activity detection signal thereto. The inhibit circuit 120 applies a suitable voltage to the transmitter 101 to prevent it from transmitting during silences in the speech signal. The first output from the speech coder 112 is applied to a first in first out (FIFO) buffer memory 105 which also has a control input connected to a second output from the sequencer 108. The signal to be transmitted arrives in the form of a series of bits at the input to the buffer memory 105 where it is stored. The memory is then read at higher speed under the control of the sequencer in order to be able to pass all the bits during the transmission bursts.

On the receiver side, the output from the receiver 102 is connected to the input of a demodulator 110. During reception, each burst is demodulated as a whole and synchronization is sought on a per burst basis, eg. by storing the entire received burst and then using a demodulator which includes a synchronizing circuit of the type described in the present Assignee's U.S. Pat. No. 4 263 672. The output from the demodulator is connected to the input of a buffer memory 109 which performs the inverse function of the buffer memory 105, ie. delivering data at a constant rate from each valid burst. To validate each burst, the master station further includes a validating circuit 111 which has one input connected to a third output from the sequencer 108 and another input connected to an output from the demodulator 110. The validating circuit checks that the bursts actually correspond to the call in progress, eg. by each burst including a signal characteristic of the channel being used, and hence of the expected mobile. Bursts which do not meet the validity criteria are eliminated and are replaced by an interpolation signal, eg. by an alternating series of 0s and 1s, supposing the speech is delta coded. In other embodiments, the validation decision may be based on an analysis of redundant information in the transmitted burst. The output 115 from the buffer memory 109 is thus the signal outut from the master station.

The circuit of the siave station 200 is very similar. It comprises a transmitter 201 and a receiver 202 having carrier frequency inputs connected to outputs from a synthesizer 203. A frequency hopping pattern generator 204 is controlled by a sequencer 208 and has its output connected to a control input of the synthesizer 203. The synthesizer also receives a driver signal from a highly stable driver oscillator 206, which oscillator also has an output connected to a clock 207. The output from the clock 207 is connected to the input to the sequencer 208 which has a second output connected to control a buffer memory 205 which receives an input signal from the station's signal input 214 via speech coding circuit 212. The speech coder has a voice activity detection output $\overline{DAV}$ connected to an input of a transmitter inhibiter circuit 220 whose output inhibits transmission by suppressing the carrier during periods of silence in the speech input signal. During reception, the output from the receiver 202 is connected to the input of a demodulator 210 having its output connected to an input of a buffer memory 209 whose output constitutes the signal output 215 from the slave station.

The main difference between the master station and the slave station lies in their synchronization. The shift input to the clock 207 is connected to receive a control signal from a validating and synchronizing circuit 221. The validating and synchronizing circuit 221 has a second output connected to a control input of the buffer memory 209. The validating portion of this circuit 221 operates in the same way as the validating circuit 111 in the master station to ignore some packets of data in the memory 205 on the basis of the signal demodulated by the demodulator 210. In addition, the validating and synchronizing circuit 221 synchronizes the clock 207. To do this it measures the instant of arrival of each burst on the basis of the rising front of the burst pulse and the synchronization bit, and corrects the clock by bringing it into phase with the rceived burst each time a burst is validated. So long as the control is both astatic and sufficiently rapid, the slave stations operate at a time which is offset relative to the master station by an amount equal to the propagation time between the stations, which depends on the position of the mobile. Since the slave station is synchronized on data transmitted by the master station, only the master station is capable if initiating a call in such a system.

Possible transmission modes include frequency duplex, time duplex, and alternating simplex mode, provided that the duration of transmission in each direction is short enough to enable the master station to send a return signal necessary for synchronization.

When using frequency duplex mode, the master station sends packets of data in successive bursts at the frequencies determined by the pattern corresponding to the called slave station. The slave station receives the data packets from the master station, with the signal applied by the synthesizer 203 to the demodulator 210 following the same pattern of frequency hops. The slave station transmits corresponding packets of data in the opposite direction in bursts at successive frequencies which are derived from the same pattern by a constant frequency offset, with the offset advantageously being equal to the receiver intermediate frequency. At the master station, the same offset is used on the frequency applied by the synthesizer 103 to the demodulator 110. This is the preferred mode of transmission for a radio communcations system in accordance with the invention.

When using time duplex transmission mode, two-burst cyclic operation is provided with the first burst in each cycle corresponding to transmission in one direction and the second burst corresponding to transmission in the other direction. The synthesizer switches on the transmitter and the receiver in each of the stations alternately under the control of the frequency-hopping pattern generator 104 or 204 as the case may be. This mode of transmission requires the data to be compressed and then decompressed which has the effect of doubling the data transmission rate required during the useful periods of the bursts. Nonetheless, this mode remains useable so long as the data rate used does not exceed the values at which multiple path propagation becomes a hinderance.

Finally, it is naturally possible to use an alternating mode with transmission or reception taking place on a single frequency, in which case the circuits 112 and 212 provide voice operated transmitter switching.

FIG. 2 shows an embodiment of a radio communications system in accordance with the invention in which a common signalling channel is provided and also used for synchronization, in which case a slave station may initiate a call. In this figure, components which are the same as components shown in FIG. 1 have been designated by the same references. This embodiment is intended to enable a periodic synchronizing signal to be transmitted to all the slave stations, even when the master station has a call set up on a code defined by the identification number of the corresponding subscriber. To do this the master station includes a second sequencer 116 in addition to the sequencer 108. Similarly, the slave station includes a second sequencer 216 in addition to the sequencer 208. The second sequencers 116 and 216 determine the periodicity at which the stations switch over to the common or general channel, eg. one burst in every 100 bursts. For this particular burst, the frequency is not determined by the identification number of a particular subscriber, but by a general number associated with the common channel, whereby all the slave stations can receive a time message in the clear. To do this, the master station further includes a time memory 117 having an input connected to the clock 107. Thus the time memory 117 is permanently updated by the clock 107. The use of network time as identifying the common channel has several advantages. Firstly, slave stations which are already in synchronization with the network can identify the common channel without ambiguity, and can therefore keep in synchronization by listening preferentially or exclusively to said time signals. Secondly, a non-synchronized slave station can use the time signals to get into synchronization, in which case all it has to do is listen on some pattern, eg. its own, provided there is a high enough probability of interference between its own frequency-hopping pattern and the common channel frequency-hopping pattern, ie. a probability of interference such that two successive interferences between the two channels are likely to occur in less than a tolerable waiting period for establishing synchronization.

In the master station, the frequency-hopping pattern generator 104 thus receives the general number which is associated with the common channel or a particular identification number associated with a called station, depending on whether the second sequencer 116 switches one or another of said numbers to the pattern generator. A switch 118 peforms the required switching function. Likewise the transmitter 101 receives data to be transmitted from the buffer memory 105 or from the time memory 117 via a switch 119 under the control of the second sequencer 116.

In the slave station the second sequencer 216 controls a switch 218 which applies the general number of the common channel or the reference number of the station in question to the frequency-hopping pattern generator 204. At the first interference in the receiver, the receiver clock 207 is forced to the received time by the validating and synchronizing circuit 221. Next time the second sequencers 116 and 216 switch to the general number, the presumed synchronization can be verified. If verification fails, a new search is begun for the time signal.

The presence of a duplex common channel also makes it possible for the slave stations to send signals to the master station. In particular the slave stations can send signals requesting that a call be set up. Such a request is transmitted simply by sending the identification number of the calling slave station during a reference burst of the common channel. The ensuing dialog, if any, then takes place on the channel defined by the identification number transmitted by the calling slave station.

If there are several master stations in a network, the system adapts readily to coordinating traffic between the entire group of stations.

To do this, a periodic reference frame defined relative to the common time of the group of networks is defined as follows: the bursts for sending timing data from each of the stations as defined by their respective second sequencers 116 are offset in time. Thus, while each master station having a call in progress cannot transmit on the common channel, synchronization is ensured by master stations which are not engaged on calls transmitting packets of time data on the common channel. In this way, calls from a master station are not interrupted.

This arrangement not only gets rid of the corresponding intrinsic interference, but also has the advantage of enabling a slave station which desires to set up a call to select the "best" available master station by transmitting its call request in synchronization with the best quality received time word, ie. in synchronization with the time word having the highest amplitude received field strength.

By way of example, the following numerical values can be used in a radio communications system in accordance with the invention. The frequency range may be 900 MHz. The frequency offset between transmission and reception may be 45 MHz. The number of frequency channels in the net may be 100, at 50 KHz spacing. Each burst may last 2 milliseconds, with a dead time of 1 millisecond between bursts. For a continuous input digital data rate of 16 Kbits/second, the data rate during each burst is 24 Kbits/second, with 48 bits being transmitted in each burst.

There is little difficulty in storing the frequency-hopping pattern of a subscriber or slave station in memory, however, each master station capable of communicating with any of the subscriber stations must be capable of instantly generating the frequency-hopping pattern of any subscriber. To do this, it is sufficient for all the patterns to be chosen from the same code family, and to establish a one-to-one relationship between each subscriber number and the corresponding frequency-hopping pattern.

While the invention has been described in connection with what is presently considered to be the most practical and preferred embodiment, it is understood that the invention is not to be limited to the disclosed embodiment but, on the contrary, is intended to cover various modifications and equivalent arrangements included within the spirit and scope of the appended claims which scope is to be accorded the broadest interpretation so as to encompass all such modifications and equivalent structures.

We claim:

1. A radio communications system comprising at least one master station and a plurality of slave stations, wherein information to be transmitted between said stations is in digital form, wherein a two-way link between any of said slave stations and a master station is established over a frequency-hopping channel in which transmission takes place in bursts of predetermined duration at different frequencies with said frequency-hopping channel being determined by a frequency-hopping pattern which is associated with each slave station, each slave station having an independent frequency-hopping pattern associated therewith and all of said frequency-hopping channels using frequencies selected from a pool of frequencies common to all of said channels, and wherein useful transmission bursts are synchronized for the system as a whole with each slave station being synchronized from data received from a master station.

2. A system according to claim 1, wherein each master station is synchronized on an external time signal common to the entire system.

3. A system according to claim 1, wherein said useful transmission bursts are separated by intervals of dead time which are short in duration relative to a duration of the useful bursts, thereby facilitating frequency changing without greatly increasing data rate during transmission and hence without greatly increasing sensitivity to multiple path propagation, all said stations including means for compressing data to be transmitted by a factor equal to a period of time between starts of two successive bursts divided by a period of time of a useful duration of a burst, together with corresponding means for decompressing received data.

4. A system according to claim 1, wherein transmission in each frequency-hopping channel is established in frequency duplex, with transmission frequencies in one direction being determined by the frequency-hopping pattern associated with one slave station and with transmission frequencies in the opposite direction being offset from said transmission frequencies in said one direction by a predetermined fixed frequency value.

5. A system according to claim 4, wherein the fixed offset frequency between the two directions of transmission is equal to a receiver intermediate frequency.

6. A system according to claim 1, wherein transmission in each frequency-hopping channel is established in time duplex, with transmission in each direction using the same pattern of frequencies.

7. A system according to claim 1, wherein transmission in each frequency-hopping channel is established with automatic alternation of transmission direction taking place on the same pattern of frequencies, switching to transmission being under control of a signal activity detector circuit.

8. A system according to claim 1, wherein said bursts are of a predetermined duration which is long enough relative to propagation delays between stations to avoid the need for synchronization accuracy to take said propagation delays into account.

9. A system according to claim 1, wherein the frequency-hopping pattern associated with a slave station is established in the master station and said slave station involved in a call on the basis of time of transmission and of an identification number associated with said slave station, each station being provided with a pattern generator, and said time of transmission being measured relative to a number of bursts in a cycle whose duration is a function of a number of frequencies available in said common pool of frequencies.

10. A system according to claim 1, further including a common signalling channel having its own frequency-hopping pattern associated therewith, said common signal frequency-hopping pattern being available at all of said stations and being switchably selectable via switching means provided at all of said stations, each master station being further provided with a time memory and means for periodically transmitting data contained in said time memory in transmission bursts at frequencies determined by said common signal frequency-hopping pattern.

11. A system according to claim 10, including a plurality of master stations, and wherein different master stations transmit on said common signalling channel at different instants.

12. A system according to claim 1, wherein said system transmits telephony, and wherein each station transmitter is provided with a transmitter inhibit circuit connected to turn off a transmitter carrier during periods of silence in between periods of active speech, and wherein each station receiver is provided with means for rejecting interference and interpolating between bursts effectively received from a station with which it is in communication.

* * * * *